United States Patent [19]
Fowler et al.

[11] Patent Number: 5,945,182
[45] Date of Patent: *Aug. 31, 1999

[54] FIRE-RESISTANT MEMBERS CONTAINING GYPSUM FIBERBOARD

[75] Inventors: George F. Fowler, Norcross, Ga.; Peter Edward Jackman, High Wycombe; Kevin D. S. Towler, Aylesbury, both of United Kingdom

[73] Assignee: G-P Gypsum Corporation, Atlanta, Ga.

[*] Notice: This patent is subject to a terminal disclaimer.

[21] Appl. No.: 08/706,481

[22] Filed: Sep. 4, 1996

Related U.S. Application Data

[63] Continuation-in-part of application No. 08/388,018, Feb. 14, 1995, Pat. No. 5,601,888.

[30] Foreign Application Priority Data

Nov. 17, 1995 [WO] WIPO ............ PCT/US95/15069

[51] Int. Cl.[6] ............................................ E06B 3/00
[52] U.S. Cl. ............................ 428/34; 428/68; 428/70; 428/921; 52/202; 52/203
[58] Field of Search .................. 428/34, 68, 70, 428/921; 52/171.3, 201, 202, 203, 204

[56] References Cited

U.S. PATENT DOCUMENTS

| | | |
|---|---|---|
| 2,075,192 | 3/1937 | George . |
| 2,076,349 | 4/1937 | Porter et al. . |

(List continued on next page.)

FOREIGN PATENT DOCUMENTS

| | | |
|---|---|---|
| 347809 | 12/1989 | European Pat. Off. . |
| 2365161 | 7/1975 | Germany . |
| 52-87405 | 7/1977 | Japan . |
| 52-42582 | 9/1977 | Japan . |
| 53-19334 | 2/1978 | Japan . |
| 53-76539 | 7/1978 | Japan . |
| 53-27739 | 8/1978 | Japan . |
| 134814 | 11/1978 | Japan . |
| 106559 | 7/1982 | Japan . |
| 165615 | 9/1984 | Japan . |
| 171261 | 9/1985 | Japan . |
| 2-108780 | 4/1990 | Japan . |
| 1217840 | 3/1986 | U.S.S.R. . |
| 748597 | 5/1956 | United Kingdom . |
| 1435884 | 4/1974 | United Kingdom . |
| 1435433 | 5/1976 | United Kingdom . |
| 1536663 | 12/1978 | United Kingdom . |
| 2053184 | 2/1981 | United Kingdom . |
| WO 91/05744 | 5/1991 | WIPO . |
| WO 93/11085 | 6/1993 | WIPO . |

OTHER PUBLICATIONS

A.A. Moslemi, "Inorganically Bonded Wood," *Chem. Tech.*, Aug. 1988, pp. 504–510.

Sattler et al., "Gypsum–Bonded Particleboards and Fiberboards," Fiber and Particleboards Bonded with Inrorganic Binders, pp. 19–25, (presented orally Oct. 24–26, 1988, copyright 1989).

Bahner et al., "New Equipment for Forming Gypsum and Cement Fiberboards from an Aqueous Slurry," *Fiber and Particleboards with Inorganic Binders*, pp. 94–97, (presented orally Oct. 24–26, copyright 1989).

(List continued on next page.)

*Primary Examiner*—Richard Weisberger
*Attorney, Agent, or Firm*—Synnestvedt & Lechner LLP

[57] ABSTRACT

Fire-resistant structures are provided having at least a 20 minute ASTM E-152 fire test rating. The structures include glass partition walls having framing members formed from a gypsum-containing composition having a density of at least about 60 lbs/ft$^3$, a flexural strength of at least 30 lbs (½ inch thick material), and a screw-holding capacity of at least about 400 lbs. The gypsum-containing composition further contains a substantially uniform distribution of solids including about 65 wt. % to about 90 wt. % set gypsum dihydrate, about 7 wt. % to about 30 wt. % paper fiber, and about 1.5 wt. % to about 35 wt. % of one or more performance boosters selected from inorganic fiber, clay, vermiculite, and binder polymer.

32 Claims, 9 Drawing Sheets

U.S. PATENT DOCUMENTS

| | | |
|---|---|---|
| 2,156,311 | 5/1939 | Schuh . |
| 2,322,194 | 6/1943 | King . |
| 2,773,764 | 12/1956 | Park . |
| 2,882,175 | 4/1959 | Bailly . |
| 2,913,308 | 11/1959 | Dailey . |
| 3,376,147 | 4/1968 | Dean . |
| 3,390,003 | 6/1968 | Cooper . |
| 3,477,905 | 11/1969 | Rogers . |
| 3,570,208 | 3/1971 | Nikai et al. . |
| 3,616,173 | 10/1971 | Green et al. . |
| 3,736,163 | 5/1973 | Hoopes et al. . |
| 3,773,533 | 11/1973 | Omoto et al. . |
| 3,839,059 | 10/1974 | Rothfelder et al. . |
| 3,944,698 | 3/1976 | Dierks et al. . |
| 3,951,735 | 4/1976 | Kondo et al. . |
| 4,045,268 | 8/1977 | Geschwender . |
| 4,047,962 | 9/1977 | Copeland . |
| 4,120,737 | 10/1978 | Berrie et al. . |
| 4,127,628 | 11/1978 | Uchida et al. . |
| 4,159,302 | 6/1979 | Greve et al. . |
| 4,174,230 | 11/1979 | Hashimoto et al. . |
| 4,202,857 | 5/1980 | Lowe . |
| 4,214,027 | 7/1980 | Knauf et al. . |
| 4,217,380 | 8/1980 | Medica et al. . |
| 4,222,984 | 9/1980 | Ladwig . |
| 4,225,359 | 9/1980 | Schneider . |
| 4,239,716 | 12/1980 | Ishida et al. . |
| 4,252,568 | 2/1981 | Bounini . |
| 4,259,818 | 4/1981 | Stark . |
| 4,328,178 | 5/1982 | Kossatz . |
| 4,335,636 | 6/1982 | Porter . |
| 4,343,127 | 8/1982 | Greve et al. . |
| 4,445,937 | 5/1984 | Bassler et al. . |
| 4,557,973 | 12/1985 | Ali . |
| 4,608,108 | 8/1986 | Goll . |
| 4,609,513 | 9/1986 | Israel . |
| 4,645,548 | 2/1987 | Take et al. . |
| 4,647,496 | 3/1987 | Lehnert et al. . |
| 4,664,707 | 5/1987 | Wilson et al. . |
| 4,678,702 | 7/1987 | Lancaster et al. . |
| 4,695,494 | 9/1987 | Fowler et al. . |
| 4,698,257 | 10/1987 | Goll . |
| 4,722,866 | 2/1988 | Wilson et al. . |
| 4,734,163 | 3/1988 | Eberhardt et al. . |
| 4,748,771 | 6/1988 | Lehnert et al. . |
| 4,810,569 | 3/1989 | Lehnert et al. . |
| 4,811,538 | 3/1989 | Lehnert et al. . |
| 4,840,688 | 6/1989 | Vogt . |
| 5,155,959 | 10/1992 | Richards et al. . |
| 5,171,366 | 12/1992 | Richards et al. . |
| 5,305,577 | 4/1994 | Richards et al. . |
| 5,342,566 | 8/1994 | Schafer et al. . |
| 5,347,780 | 9/1994 | Richards et al. . |

OTHER PUBLICATIONS

Proceedings of the Second International Inorganic Bonded Wood and Fiber Composite Materials Conference, Natus, G., "Gypsum Fiberboard Production in Nova Scotia, Canada," 1991, pp. 85–87.

Proceedings of the Second International Inorganic Bonded Wood and Fiber Composite Materials Conference, Godfrey J., "Experiences in Gypsonite Manufacturing," 1991, pp. 88–93.

Proceedings of the Second International Inorganic Bonded Wood and Fiber Composite Materials Conference, Takahashi, Watanabe, Koga and Kaneko, "Gypsum—Cellulose Fiberboard by the Hatschek Process," 1991, p. 94.

Proceedings of the Second International Inorganic Bonded Wood and Fiber Composite Materials Conference, Furman, H., "Marketing Opportunities for Gypsum Fiberboard," 1991, pp. 133–135.

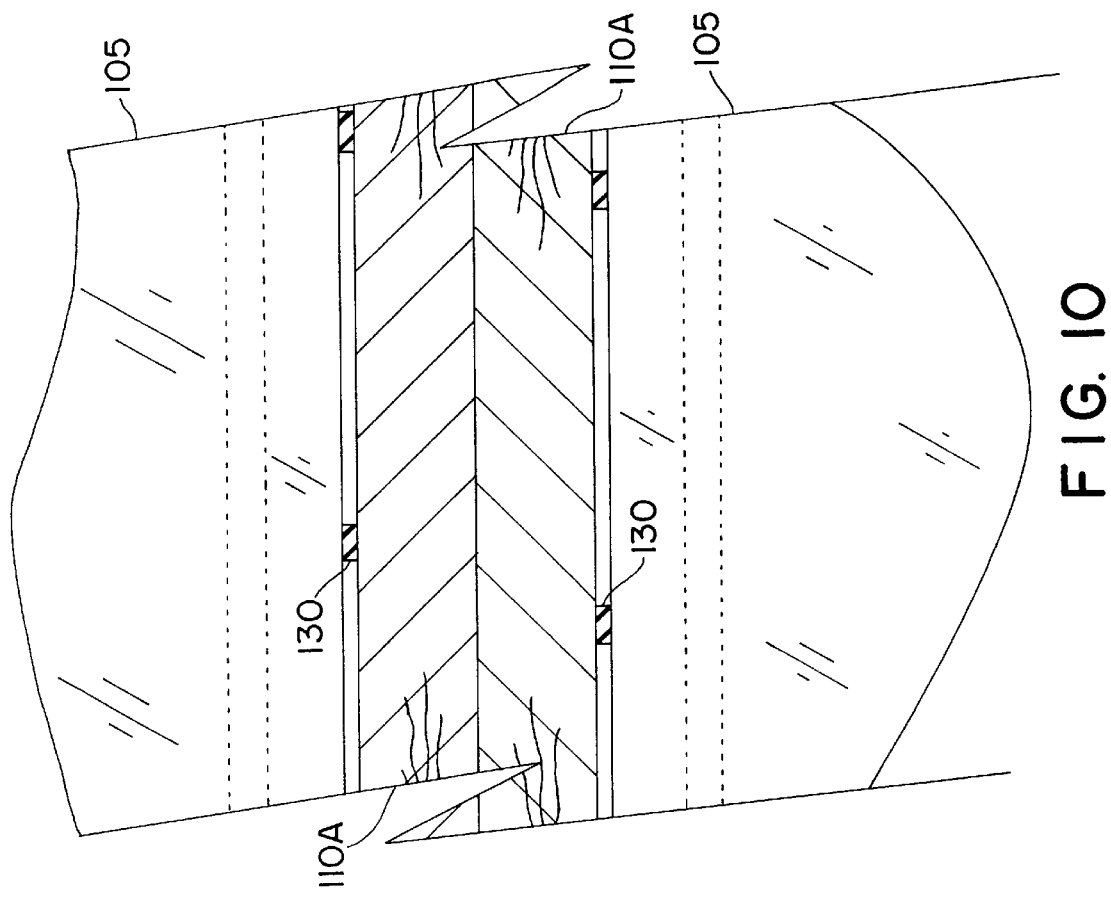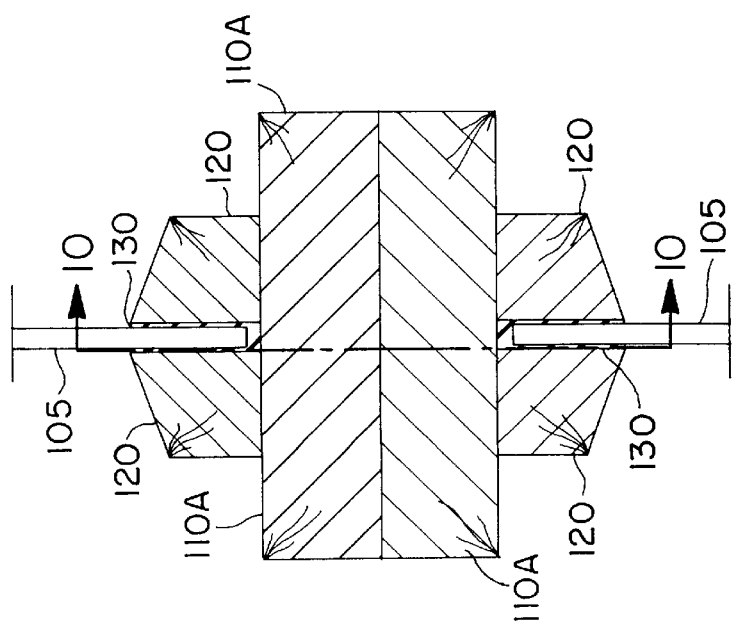

FIRE-RESISTANT MEMBERS CONTAINING GYPSUM FIBERBOARD

RELATED APPLICATIONS

This application is a continuation-in-part of U.S. application Ser. No. 08/388,018, filed Feb. 14, 1995 now U.S. Pat. No. 5,601,888. This application also claims the foreign priority benefit of PCT/US95/15069, filed Nov. 17, 1995.

FIELD OF THE INVENTION

This invention relates generally to fire-resistant framing members suitable for use in a variety of applications, including framing for windows, doors, partition walls and the like. More particularly, the present invention relates to mineral-containing compositions for providing structures with superior fire resistance and economical construction characteristics.

BACKGROUND OF THE INVENTION

The construction industry has typically relied on structural members made of wood for applications such as window and partition framing. One attractive feature of wood in such applications is the ability of wood members to hold screws and nails. This characteristic is advantageous because it permits economical joining of the members to one another and/or other structures, including items of hardware. Wood can also be easily worked in the field using hand tools and can be easily stained or painted to match other wood trim or panelling.

On the other hand, wood is susceptible to damage by fire. This is especially disadvantageous as a result of the recently increased emphasis on fire retarding properties of building materials, particularly commercial structures, as evidenced by modern building codes.

The use of wood framing members for interior glass partitions, also sometimes referred to as "wall screens" or "glazing wall screens," presents particular difficulties during exposure to fire. For example, wood not only degrades relatively rapidly in fire, but it also tends to warp from the heat when exposed to fire, possibly resulting in mechanical failure of the partition wall. Furthermore, radiant heat from the fire passes through the glass and causes combustion of the wood framing members on the unexposed side of the wall.

In addition to its failure to meet fire test standards, other disadvantages are associated with the use of wood as framing material. For example, the supply of clear wood stock is limited and costs have risen as a result. Although techniques have been developed to fabricate longer wood members from a plurality of short pieces of clear wood stock, these techniques introduce additional steps and equipment and hence higher costs.

In view of the above, and particularly due to building codes requiring fire retardant glass partition walls and the like, steel has become the material of choice for many framing applications. Nevertheless, steel members also suffer from shortcomings. For example, steel members expand and distort with great force as temperatures rise in a fire. This causes great difficulty in the use of steel framing as mullions and transoms in glass partition walls because the distortion force exerted by the steel member could shatter the glass during a fire.

In an effort to avoid the difficulties associated with the use of steel and wood framing members in fire rated structures, voids are frequently used between the glass and the steel or wood member. However, this solution causes expensive complications in the design of systems that are also resistant to passage of fire and heat. For example, because of the sacrificial nature of wood and the sever distortion of steel, it is required that complicated and expensive intumescent gasket material be disposed in the voids between the glass and the framing member.

Steel members also possess the disadvantage that they cannot be readily worked at the building site and hence even minor adjustments such as to frame height, for example, cannot be readily accomplished in the field. Furthermore, steel frames are typically prefabricated by welding, making handling difficult and taking up more shipping space than would be required if the frame members could be shipped in a knocked-down condition. In addition, steel frames cannot be stained to match the remaining woodwork in a room and accordingly must either be painted or treated with applications which simulate a wood finish.

There is accordingly a need for a framing member which provides adequate fire resistance at a relatively low cost, which can be easily modified at the construction site and which has good screw- and nail-holding properties, as well as an attractive finished appearance. There is also a need to eliminate or substantially reduce the use of intumescent gasket material in fire rated structures. These needs are particularly acute with respect to framing members such as mullions, transoms and beads used to support glass panels and like materials, such as in glass partition walls and in doors having window lites.

SUMMARY OF THE INVENTION

This invention provides fire-resistant structures suitable for use in numerous applications, including glass partition walls comprising panels of glass or glass-like material supported by framing members. The structures preferably have at least a 20 minute ASTME-152 fire test rating and include a member comprising a gypsum-based fiberboard composition having a density of at least about 60 lbs/ft$^3$, a flexural strength of at least 30 lbs (½ inch thick material), and a screw-holding capacity of at least about 400 lbs. The composition of the framing members preferably comprises a substantially uniform distribution of solids including about 40 wt. % to about 97 wt. % set gypsum dihydrate, about 1.5 wt. % to about 30 wt. % paper fiber, and optionally about 1.5 wt. % to about 35 wt. % of one or more performance boosters selected from inorganic fiber, clay, vermiculite, and binder polymer.

Accordingly, practical and economical fire-resistant structures are provided which have excellent fire-resistance characteristics, as well as important and desirable environmental benefits. The gypsum fiberboard members of this invention are both safe and effective for use in structural elements subject to high temperatures. The present members can be produced relatively inexpensively and can be incorporated into glass partition walls, window framing and the like without rendering them excessively heavy.

BRIEF DESCRIPTION OF THE DRAWINGS

The accompanying drawings illustrate preferred embodiments of the invention as well as other information pertinent to the disclosure, and in which:

FIG. 9: is a cross-sectional view of an alternative construction for a horizontal framing member and bead in accordance with the present invention; and FIG. 10: is a cross-sectional view taken along lines 10—10 in FIG. 9.

DETAILED DESCRIPTION OF THE INVENTION

Figure 1:
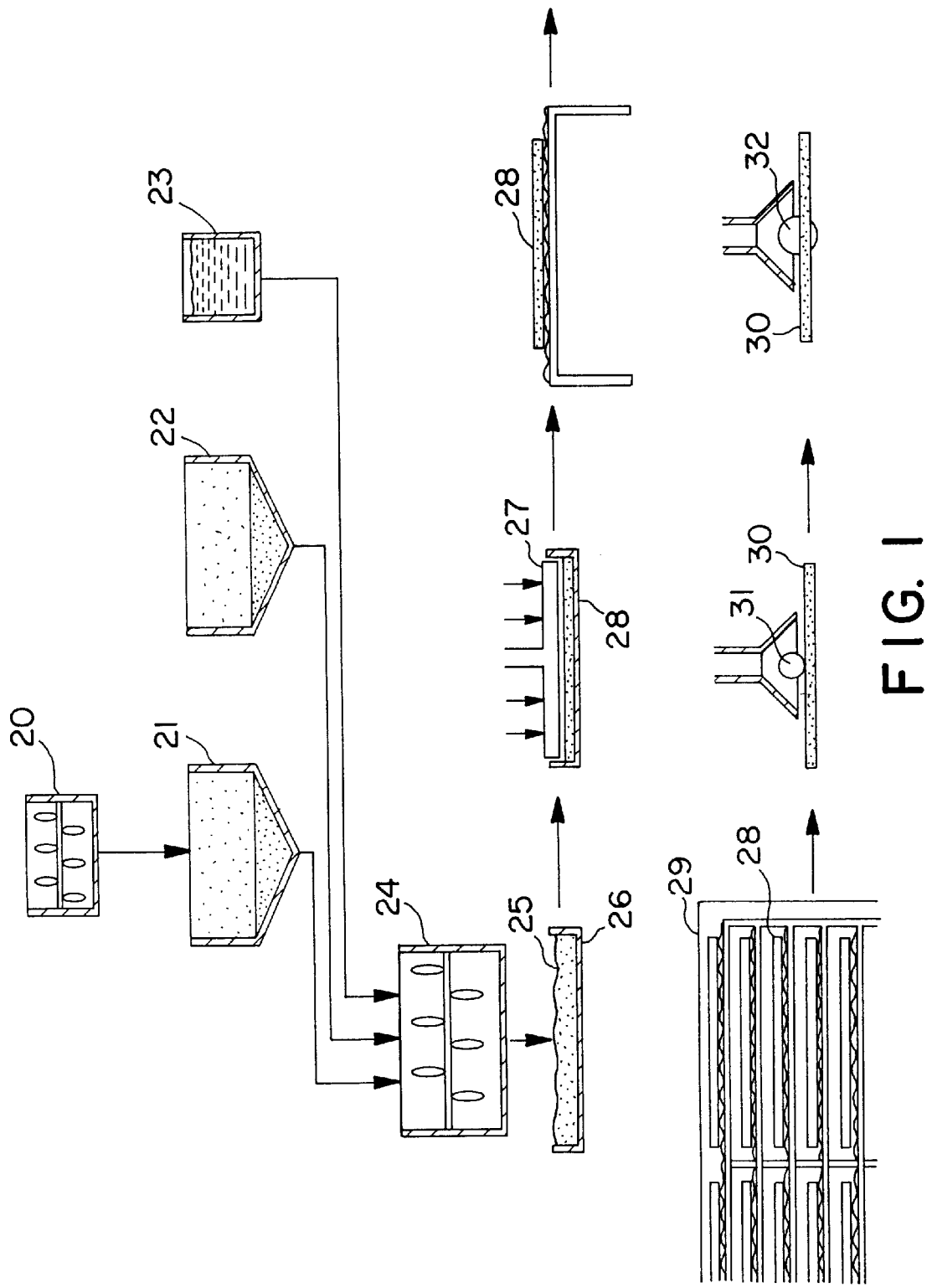
FIG. 1: is a flow diagram which illustrates the process of this invention by which gypsum-containing framing members are made.

Fire-resistant structures and specific framing members are provided by this invention. The structural members of this invention are comprised of a gypsum-based article derived from fiberboard having a density of at least about 50 lbs/ft$^3$ and even more preferably at least about 60 lbs/ft$^3$ and a screw-holding capacity, defined below, of at least about 400 lbs. The present members also preferably have a flexural strength of at least about 30 lbs (½ inch thick material) and a tensile strength of at least about 120 lbs.

These framing members are preferably comprised of a composition containing from about 50 wt. % to about 97 wt. % set gypsum dihydrate, about 1.5 wt. % to about 30 wt. % paper fiber and optionally about 1.5 wt. % to about 35 wt. % performance booster.

A more specific embodiment of this invention includes a structure comprising glass panels at least partially supported by a framing member comprised of gypsum-based composition as described above. It should be understood that the term "glass panel" is used herein to encompass any transparent, translucent or similar fire resistant glass-like material. Furthermore, this term is intended to include materials which include glass and glass-like panels which have supporting and/or enhancing components embedded therein or coated thereon. Thus, the materials available under the following tradenames are adaptable for use as glass panels in accordance with the present invention: FIRELITE, PYROSWISS, PYROBEL, PYROBELITE, FYRESPAN, PYRAN, PYROSTOP, and PYRODDUR. Glass panels are available in a wide variety of dimensions, and it is contemplated that all such dimensions are within the scope of the present invention. Nevertheless, the thickness of the glass panel will frequently depend on the particular material of construction and on the degree of fire protection desired for any particular application. In general, the glass thickness is preferably from about ¼ inch to about 2 inch.

It is contemplated that the framing member may be provided in a large variety of dimensions, depending at least to some extent on the thickness of the glass panel being used and on whether or not insulation is required. It is generally preferred that the member have a width and/or thickness dimension slightly larger than the thickness of the glass panel. Accordingly, dimensions ranging from 2 inch×2 inch to about 2 inch×3 inch are contemplated. In such embodiments, it is also preferred that the framing members are formed from a gypsum-based composition comprising about 75 wt. % to about 93.5 wt. % set gypsum dihydrate, about 5 wt. % to about 17 wt. % paper fiber, and about 1.5 wt. % to about 35 wt. % of a performance booster selected from inorganic fiber, clay, vermiculite, and binder polymer. The gypsum fiberboard members of this embodiment preferably have a flexural strength of at least about 40 lbs (½ inch thick material), a screw-holding capacity of at least 500 lbs, and are covered with a thin, wood or wood-like veneer. When used as a framing member in glass partition walls and like applications, this composition preferably has at least a 20 minute ASTME-152 fire test rating, and even more preferably a 90 minute ASTME-152 fire test rating. According to other embodiments, the present invention provides a glass-panel containing partition wall capable of achieving a 90 minute rating under British standard BS476: part 2: 1987.

Various tests have been devised for determining the reliability of fire-resistant structures, such as fire doors. Such tests are based, in part, on the period of time during which a given construction can withstand a certain temperature while maintaining its integrity. One such test is the ASTME-152 fire test, which requires the structure to maintain its integrity for periods ranging up to 1.5 hours while withstanding progressively higher temperatures within the range of 1750° F. to 1800° F. Another characteristic of high quality fire-resistant structures is the ability of such structures to retain their integrity and shape when exposed to a hose stream test of the type described in detail hereinafter (see Example 5). Applicants have found that structures which maintain a high degree of integrity under fire test conditions and also exhibit exceptional performance when exposed to the hose stream test are possible in accordance with the present invention. This beneficial feature derives, in large part, from the use of gypsum-based fiberboard materials in accordance with the present invention since such materials exhibit excellent hose stream resistance. For example, the gypsum fiberboard products of the present invention are capable of exhibiting hose stream resistance values of at least about 20 seconds, more preferably at least about 30 seconds, and even more preferably at least about 50 seconds. Accordingly, the present invention provides fire-resistant structures, including fire-resistant structures comprised in major proportion of glass panels, capable of exhibiting hose stream endurance values of at least about 20 seconds, more preferably at least about 30 seconds and even more preferably 50 seconds.

Fiberboard Construction

As used herein, the term "gypsum fiberboard" is used in a broad sense to refer to any article of manufacture comprised of set gypsum in substantial proportion (e.g. greater than about 30% by weight) and preferably in major proportion, and cellulosic and/or other fibrous materials in minor proportion. Furthermore, this term is not used herein to designate or otherwise limit any of the dimensional configurations of the article of manufacture.

The preferred fiberboard members of this invention at once posses a high degree of both fire resistance and structural integrity. An important and highly advantageous feature of the fiberboard members in accordance with the present structures, and particularly structures containing panels of glass and like material, is the excellent fastening capacity associated with such members. More specifically, the members used in the glass partition walls are readily adhered to one another and to other structural members using conventional means, including adhesives, screws, nails and the like. As will be appreciated by those skilled in the art, this characteristic is of critical importance for the economical and efficient construction of structures such as glass partition walls. Furthermore, the bondability of the fiberboard members of the present invention allows the economical application of thin veneers and other surface decorations to the exposed surfaces of the structural member. This greatly and advantageously expands the number of environments and decorative motifs to which the present invention is adaptable.

The fiberboard members of this invention do not require a facing material, such as paper or glass mat, for flexural strength. It will be appreciated that since paper products generally have very poor fire resistance, the absence of such materials from the members of the present invention contribute to the fire and water resistant properties of the present invention. Thus, while paper facings are not preferred in accordance with the present invention, such facings can be optionally employed if the particular application so dictates. On the other hand, glass mat facings are generally very resistant to fire and therefore do not present the disadvantage of paper facing. In certain applications, therefore, the use of glass mat facings may be advantageously used.

The composition of the preferred fiberboard members is preferably a uniform distribution of solids, which includes by weight, about 65% to about 95% set gypsum dihydrate, about 5% to about 30% cellulosic fiber, and optionally but preferably about 1.5% to about 35% of one or more performance boosters selected from inorganic fiber, clay, vermiculite, and binder polymer and combinations of those.

One of the essential constituents of the gypsum-containing fiberboard members of the present invention is calcium sulfate dihydrate. This constituent is derived from the hydration of any form of calcium sulfate which is preferably in non-fibrous form and which is capable of reacting with water to form set gypsum, that is, calcium sulfate dihydrate. Thus, the calcium sulfate can be in anhydrous form or in the hemihydrate form. It is believed that the hemihydrate form of calcium sulfate will be used most widely. The hemihydrate can be produced from the naturally-occurring gypsum mineral by heating, or calcining, the dihydrate.

For many applications, it is not important to inquire into the crystalline form of the hemihydrate. It is known that calcium sulfate hemihydrate can exist in two different crystalline forms, namely a non-fibrous form and a fibrous form, for example, elongated needles, such as the fibrous alpha-calcium sulfate hemihydrate disclosed in U.S. Pat. No. 4,239,716, which is hereby incorporated by reference. In the practice of this invention, the gypsum-based composition preferably comprises a non-fibrous form of calcium sulfate capable of reacting with water to form set gypsum. It should be understood, however, that a minor amount of a fibrous form of gypsum can be used as an optional constituent.

As mentioned above, one of the advantages of the present invention is that waste-type materials can be used in fabricating the fiberboard members. For example, there can be used as the source of the calcium sulfate the material known as "desulfurized by-product gypsum" which is produced by the desulfurization of flue gas. Another example of a waste- or scrap-type material that can be used in the practice of the present invention is scrap gypsum wallboard, which can be used as a source of both calcium sulfate and the paper constituent of the fiberboard. For this purpose, scrap paper-faced gypsum wallboard can be ground into suitably small particles which are processed in water under pressure and in the presence of a crystal modifier to form non-fibrous calcium sulfate hemihydrate. Scrap gypsum wallboard can also be transformed into a suitable material for use in the practice of the present invention by grinding and calcining it at atmospheric pressure. Sufficient water can be used to form the desired pulp-type material from which the product is conveniently made. This invention can employ any of the above-disclosed individual sources of calcium sulfate, but a mixture of the different sources of calcium sulfate can also be used.

In the use of an aqueous dispersion to make the gypsum-containing fiberboard members, the non-fibrous calcium sulfate preferably will comprise a substantial proportion of the total solids, and more preferably from about 35% to about 97% by weight of the total solids in the dispersion, and even more preferably from about 55% to about 92% by weight, depending upon the specific application for the resultant building material. For example, in a building board to be employed as edge banding in a fire door, the non-fibrous calcium sulfate content of the dispersion may be in the range of about 45% to about 75% by weight of the solids, and even more preferably of about 45% to about 75% by weight of the solids. On the other hand, in a framing member to be used as the support for glass panels in an interior partition wall, the calcium sulfate content of the dispersion may lie from about 65% to about 95% by weight of the solids and even more preferably from about 85 to about 90% by weight of the solids.

The gypsum dihydrate content of the preferred fiberboard members of this invention will be approximately 18.5% greater than the non-fibrous calcium sulfate content of the compositions from which they are made, the difference representing the added water of hydration in the set gypsum dihydrate. That is, by weight, the set gypsum preferably comprises from about 42% to about 97.5% by weight, and even more preferably between about 60% and about 94% by weight of the overall set composition. A preferred member for use as edge banding in a fire door preferably comprises from about 40% to about 78% by weight of set gypsum. A preferred framing member to be used as the support for glass panels in an interior partition wall comprises set gypsum in an amount of about 85% to about 95% by weight of the set composition.

The compositions of the preferred fiberboard members of this invention also employ a substantial amount of cellulosic fiber. Cellulosic fiber includes the fibrous component of plants, such as cotton, linen, and flax, for example. Among the various sources of cellulosic fiber, paper stock is conveniently employed. That is, the solid component involved in each of the aforesaid aspects of the invention preferably includes by weight about 1.5% to about 30% paper fiber, more preferably between about 5% and about 17%. Building materials intended for use in various specific products may contain somewhat different amounts of paper fiber. For example, a member intended for use as edge banding in a fire door may contain about 15% paper fiber by weight, while a member intended to be used as a support in a glass partition wall preferably contains from about 5% to about 10% by weight of paper fiber. The presence of the paper fiber makes it possible to produce building materials having good physical characteristics such as flexural strength, screw- and nail-holding capacity, and surface hardness without the need for a separate surfacing membrane such as the paper facing on conventional gypsum wallboard.

The paper fiber can be derived from either virgin paper stock, or previously used, waste paper stock can be employed. The source of the cellulosic fiber can be wood, cotton or linen rags, straw, etc.; however, paper fibers are preferred. The paper may be a product of the sulfite process, the sulfate (Kraft paper) process, or other processes. Among the types of paper stock that have been successfully employed are virgin and brown Kraft papers, and especially, newsprint. Waste newspaper provides very satisfactory results, is inexpensive, and its use helps to overcome an environmental pollution problem. And, as mentioned hereinabove, the source of the paper stock can include the paper of ground paper-faced gypsum wallboard.

Fiberboard members within the scope of this invention desirably and preferably include one or more performance boosting additives, their specific nature depending to some extent on the intended utility of the final product. In almost every case, there will be desirably used one or more defoaming agents, dispersants, and accelerators, ingredients which are well known in the art and are employed at low concentration levels, generally each at less than about 1% by weight of the solids. In the aggregate, the performance booster generally will comprise about 1.5% to about 35% by weight of the solids and will preferably be selected from inorganic fiber, clay, vermiculite, and binder polymer.

Inorganic fiber, as that term is employed herein, includes glass textile fiber and mineral wool. These latter terms are defined in U.S. Pat. No. 4,557,973, and those definitions are incorporated herein by reference. Briefly the term "mineral wool" means glass or other mineral fibers prepared by attenuating a melt of glass, basalt, blast furnace slag or other vitreous mineral composition from the face of a heated centrifugal rotor or the like. This process is in contrast to that used to produce textile fibers, where the melt is drawn through an orifice. An especially useful and readily available type of mineral wool is glass wool as found in glass wool insulation material. Glass textile fiber and glass wool, jointly or severally, are referred to herein as "siliceous fiber." As employed in this invention, the glass textile fiber generally will be chopped, e.g., the fibers may be about ½ inch long.

The fiberboards of this invention preferably include siliceous fiber. Siliceous fiber improves the fire resistance of the building materials and other products of this invention, apparently by decreasing the tendency of the gypsum construction to crack under thermal stress. The siliceous fiber preferably comprises up to about 7% by weight and may include glass textile fiber and, in addition, glass wool, depending upon the specific product. For example, a building board intended for use as edge banding in a fire door preferably includes up to about 7% by weight glass textile fiber, whereas a framing member for use in glass partition walls most preferably from about 1% to about 2% by weight of glass fiber.

The performance booster preferably includes clay and/or vermiculite, and even more preferably both. The use of such additives are especially desirable for members requiring excellent fire resistance. Both of these materials may be present in amounts up to about 15.0% by weight or greater, preferably up to about 6%, and more preferably from about 0.5% to about 2% by weight of the solids. The clay to be employed will generally be kaolin clay, which is effective to control the shrinkage of the gypsum-containing construction under extreme heat, for example, ASP 70 Kaolin clay sold by Minerals and Chemicals Philip Corporation. The vermiculite should be raw, or unexpanded vermiculite, which swells when heated, helping to control shrinkage of the construction and possible cracking. The requirement for the presence of these materials depends somewhat on the intended use for the final product.

The composition of the preferred fiberboard members of this invention, as well as the construction techniques for fabricating such members by adhesively bonding wood veneer and the like to the surface of the member, may also employ binder polymer. The binder polymer affects the physical properties of the fiberboard members, especially their flexural strength, and also permits good fastener retention at lower density. Furthermore, the binder polymer improves the surface characteristics and flexural strength of the member, especially when applied as a coating on the surface thereof.

The binder polymer, when present, may comprise up to about 15% by weight of the solids or greater, but preferably about 1% to about 3% by weight. A number of different polymeric materials may be employed as binder polymer, including homopolymers, such as poly(vinyl acetate) and polyacrylate, as well as copolymers, such as poly(ethylene)-co-(vinyl chloride), poly(styrene)-co-(butadiene), and poly (vinyl acetate)-co-(methyl acrylate). Among the various binder polymer possibilities, esters of poly(vinyl alcohol) are especially effective, and poly(vinyl acetate) homopolymer is preferred. It is also convenient in most cases to introduce the binder polymer as an aqueous emulsion, many of which are commercially available.

In selecting the binder polymer, thermoplastic resins are preferred since they tend to form a tough, forgiving film, rather than a brittle film, or one which is soft and has a very low tensile strength when applied for joining the surfaces of the fiberboards, stiles, and rails. Thermoplastic resins are also preferred since the heat required to set a thermosetting resin tends to calcine the gypsum in the preferred fiberboard compositions of this invention. One particularly useful resin emulsion, which is suitable for use as the resin polymer of the preferred fiberboard composition and as an adhesive for bonding the various fire door and fire panel elements to one another is UCAR-130 poly-(vinyl acetate) polymer by Union Carbide.

The composition for preparing the fiberboard members of this invention will also include water in an amount in excess of that required to react with and hydrate the calcined non-fibrous gypsum. That is, at least about, and preferably greater than, a 10-fold excess amount of water should be present. Contrary to the conventional wisdom, the excess water provides processing advantages and leads to products which possess superior properties.

Although the fiberboard compositions of this invention may be formulated in a variety of ways, and any number of different techniques may be employed to produce the members this invention, a process which is preferred for making these structures is illustrated diagrammatically in FIG. 1. With reference to FIG. 1, the paper fiber component, e.g., newspaper, together with water, at least about 20 times as much water by weight as paper, are added to pulp 20, and the mixture is reduced to pulp, producing a substantially homogeneous suspension. Glass wool, if it is specified in the composition, can be separately pulped in at least about 20 times its weight of water and the separately pulped wool and paper combined. Alternatively, the paper and glass wool can be pulped together, if desired, in at least about 20 times their combined weight of water. Any textile glass fiber, clay and vermiculite are then added to the pulper and thoroughly mixed and incorporated into the suspension. The suspension is then transferred to tank 21.

As needed and required for the composition, pulped suspension from tank 21 is added to mixer 24, any binder polymer from tank 22 as may be required for the composition is added to mixer 24, and sufficient non-fibrous calcium sulfate to yield the requisite amount of dihydrate when reacted with less than about 5% of the water is added from tank 23 to mixer 24, wherein all the components are mixed and incorporated into the suspension, producing a slurry.

The wet slurry 25, sometimes referred to herein as "gypsum stucco", is then cast into mold 26, and the slurry is pressed under hydraulic press 27 for dewatering the slurry and for producing a green casting 28. It will be appreciated that the mold 26 can be adapted to form the gypsum slurry 25 into the final shape and dimension of the member to be produced. For example if an elongate member to be used as a stud is desired, a mold having the appropriate dimension to produce the finished product can be employed. Alternatively and preferably, the mold can be in the form a more conventional sheet have the appropriate thickness, which after setting and drying is cut to the desired width and/or length.

The pressure employed in the hydraulic press 27, together with the amount of paper fiber in the composition, determines the density of the final product; densities in the range of about 40 lbs/ft$^3$ to about 75 lbs/ft$^3$ being readily attained. For the fire-resistant applications of this invention, a density of at least about 60 lbs/ft$^3$, more preferably above 65 lbs/ft$^3$, and even more preferably above about 75 lbs/ft$^3$ is preferred.

The green casting is allowed to set and is then conveyed into oven 29 and the set casting is dried. If desired, dried set casting 30 may be sanded at sanding station 31 to the desired thickness and/or then cut to the desired size with saw 32. It will be evident that the aforesaid steps can be adapted to either a batch or continuous process.

In the preferred continuous process for manufacturing members within the scope of the present invention, the aforementioned aqueous dispersion of constituents is formed into a sheet of indefinite length by the use of standard paper-making techniques. For example, the aqueous dispersion of constituents can be fed from a head box of the type associated with a paper-making machine to a foraminous moving belt through which water drains as the mass of solids coagulates and sets. The resulting composite sheet is consolidated by passing through press rolls. Heated rollers can also be used to dry the sheet.

The processes of the present invention can be used to make an unsupported (unfaced) fiberboard which has a substantially uniform and homogeneous composition throughout its thickness. The term "unfaced" is used herein to mean that the fiberboard is preferably not faced with a sheet material, for example, the paper or glass fiber mat that is often used as a facing material for gypsum wallboard.

As mentioned above, it is preferred that the fiberboard members of the present invention have a density of at least about 60 lbs/ft$^3$, but it will be understood that the material can have a density of as low as 40 lbs/ft$^3$ for some applications. In order to achieve the minimum flexural strength and screw-holding capacity referred to above (30 lbs and 400 lbs respectively) in building materials having densities below 60 lbs/ft$^3$, there should be included in the composition from which the building material is made relatively high amounts of binder polymer, for example, about 25 wt. % to about 35 wt. % based on solids content. For applications in which such flexural strength characteristics and screw-holding capacity are not considered important, the use of such binder polymer can be absent or provided in smaller amounts. The density of the fiberboard can be controlled by the use of pressure in forming the product and/or by the use of a low-density material, for example, expanded perlite.

Table I presents data obtained in producing building materials using the aforesaid batch process and various cellulosic fibers. All samples were pressed at 300 psi in a 4 inch by 4 inch mold. Samples were removed from the mold after pressing, hydrated, and then dried at 110° F. The dried samples were sanded to about 0.3 inches thick, cut to 1 inch wide by 4 inches long and tested for flexural strength on 3 inch centers. As reported in Table I below, the various cellulosic fibers used in forming the fiberboard panels comprise either wood chips which are pulped (comparative example) or paper stock which is pulped, the paper stock comprising either newspaper, Kraft paper, sulfite paper or paper of the type used to face wallboard. The significant improvements achieved by using the pulp of paper stock relative to the use of wood pulp are evident from the results reported in Table I.

TABLE I

Fiberboard Cellulosic Fiber Source Sample Data

| | Cellulosic Fiber | | | | |
|---|---|---|---|---|---|
| | Newspaper | Kraft | Wood Pulp | Sulfite | Wallboard |
| Weight of Water (g) | 500.0 | 500.0 | 500.0 | 500.0 | 500.0 |
| Weight of fiber material (g) | 20.0 | 20.0 | 20.0 | 20.0 | 20.0 |
| Time to vortex (sec) | 24.0 | 291.0 | 0.0 | 191.0 | 377.0 |
| Weight of Pulp Solution (g) | 508.9 | 505.6 | 512.3 | 512.7 | 511.3 |
| Weight of Gypsum (g) | 113.0 | 113.0 | 113.0 | 113.0 | 113.0 |
| Weight in mold prior to press (g) | 616.0 | 611.7 | 620.3 | 618.2 | 614.5 |
| Water/gypsum off before press (g) | 267.5 | 265.7 | 383.9 | 273.2 | 289.0 |
| Water/gypsum off during press (g) | 159.7 | 158.7 | 98.7 | 142.6 | 137.3 |
| Gypsum lost before press (g) | 2.82 | 5.47 | 36.59 | 5.07 | 1.33 |
| Gypsum lost during press (g) | 0.61 | 0.73 | 4.02 | 0.74 | 0.3 |
| Total water lost during press (g) | 423.77 | 418.2 | 441.99 | 409.99 | 424.67 |
| Weight of sample-wet (g) | 180.98 | 179.7 | 126.7 | 177.28 | 183.12 |
| Weight of sample-dry (g) | 137.74 | 134.41 | 84.78 | 134.71 | 139.52 |

TABLE I-continued

Fiberboard Cellulosic Fiber Source Sample Data

|  | Cellulosic Fiber | | | | |
| --- | --- | --- | --- | --- | --- |
|  | Newspaper | Kraft | Wood Pulp | Sulfite | Wallboard |
| Water lost during drying (g) | 43.24 | 45.29 | 41.92 | 42.57 | 43.6 |
| % mixture actually in sample | 97.3 | 96.6 | 98.0 | 97.7 | 97.1 |
| % total water lost before drying | 87.8 | 87.9 | 98.5 | 85.1 | 87.8 |
| % total gypsum lost before drying | 0.031 | 0.057 | 36.7 | 0.053 | 0.015 |
| Weight of 1" sample (g) | 25.4 | 24.92 | 15.59 | 26.66 | 24.52 |
| Caliper of 1" sample (in) | 0.318 | 0.321 | 0.314 | 0.322 | 0.319 |
| Density of 1" sample (lbs/in$^3$) | 73.187 | 71.731 | 46.352 | 76.52 | 70.498 |
| Flexural strength (lbs) | 40.44 | 45.3 | 1.05 | 50.23 | 29.67 |

Figure 2:
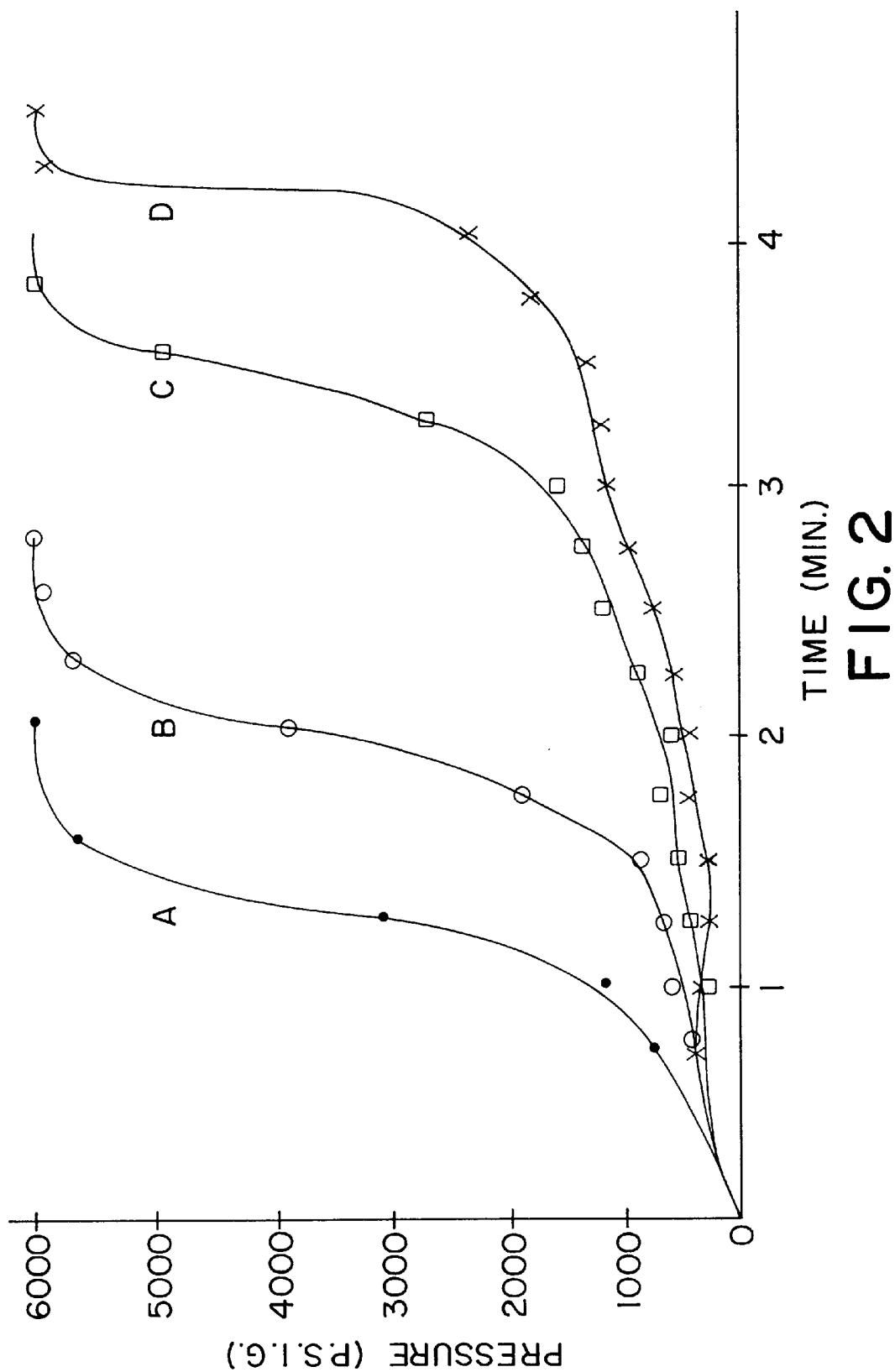
FIG. 2: is a graphical illustration of the effect of one of the components in a preferred fiberboard composition of this invention on one of the processing steps.

In contrast to that which has been taught previously in the gypsum arts, such as in U.S. Pat. No. 4,557,973, it is not necessary in the process described above to pretreat the glass wool with powdered gypsum prior to its use. Furthermore, the presence of the excess amount of water permits the gypsum slurry to flow out in the mold to a uniform thickness. In pressing the slurry to produce the green casting, care is required in order to prevent geysering, in which streams of slurry suddenly exit the mold with a great deal of force. This can be avoided by applying pressure slowly to the slurry. The amount of binder polymer in the slurry has an effect on the press time as shown in FIG. 2. The data shown in FIG. 2 were obtained from casting compositions of this invention prepared as set forth in Fiberboard Example 1.

FIBERBOARD EXAMPLE 1

Four casting compositions were prepared containing the following ingredients in parts by weight:

TABLE II

Fiberboard Compositions with Varying Polymer Binder Concentrations

| Ingredient | A | B | C | D |
| --- | --- | --- | --- | --- |
| gypsum hemihydrate | 113 | 113 | 113 | 113 |
| newspaper | 20 | 20 | 20 | 20 |
| polymer binder[a] | 0 | 2.2 | 4.4 | 8.7 |
| water | 500 | 500 | 500 | 500 |

[a]polyvinyl acetate (UCAR-130)

Figure 3:
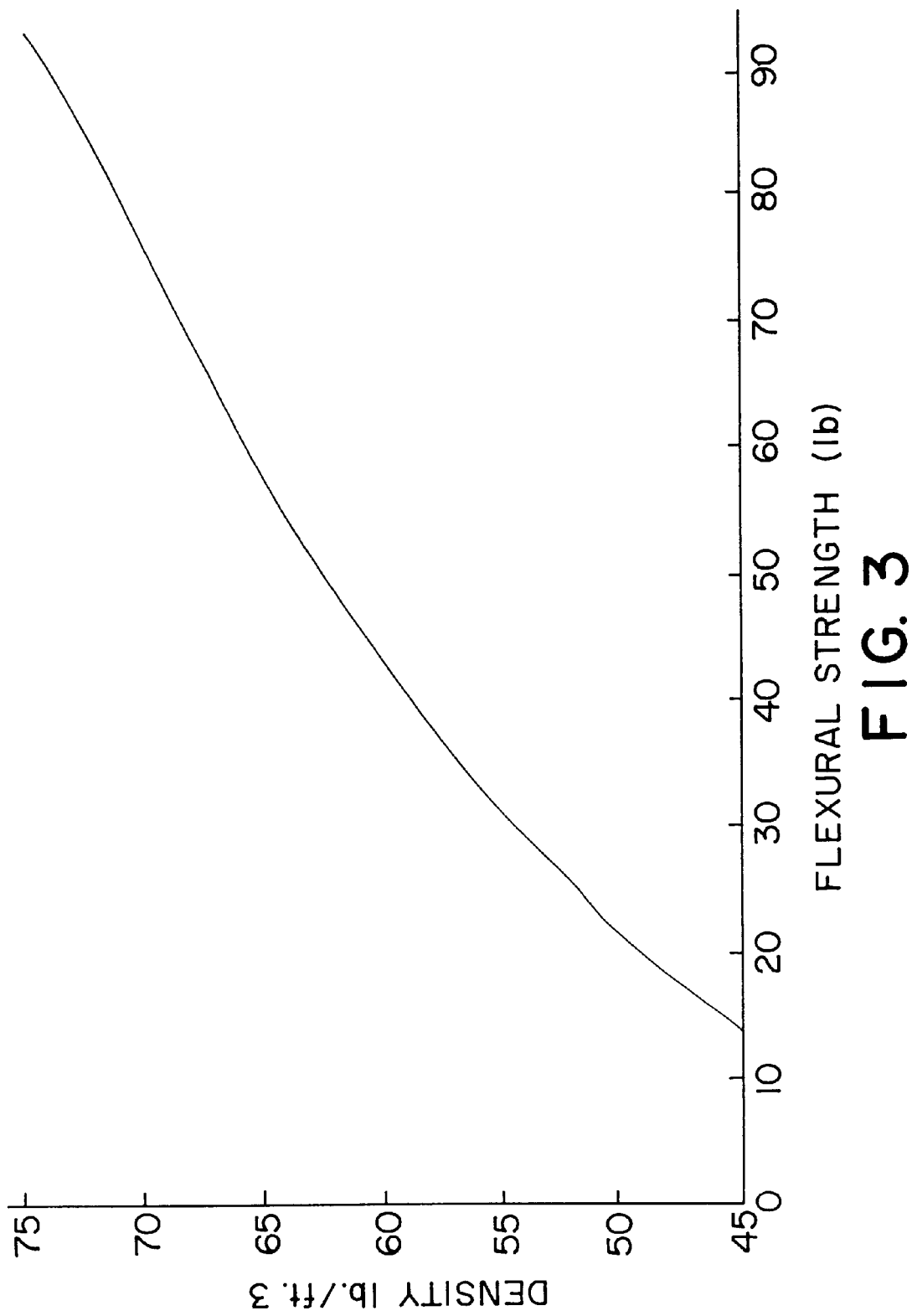
FIG. 3: is a graphical illustration of the flexural strength of fiberboards of this invention as a function of the density of the material.
Figure 4:
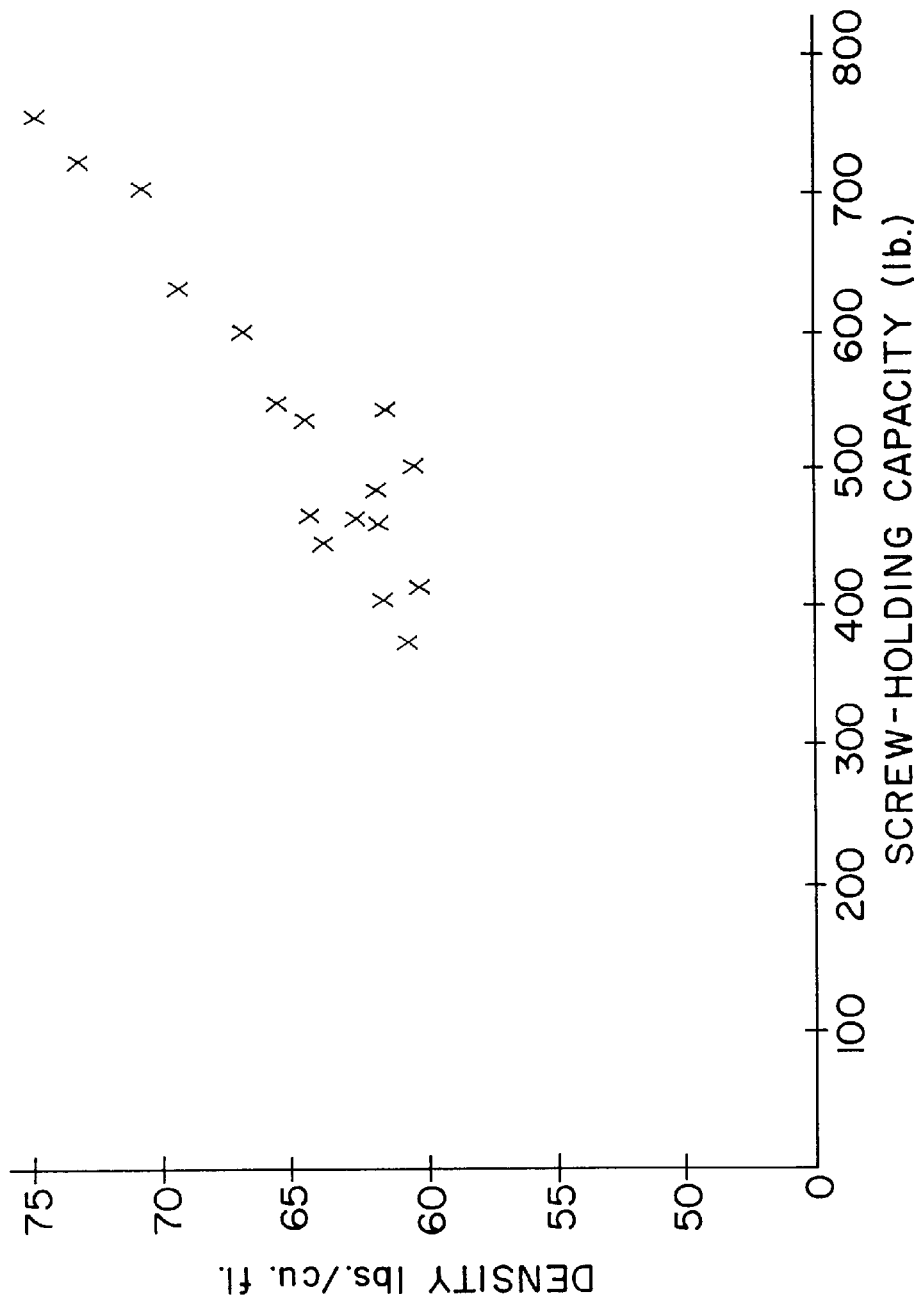
FIG. 4: is a graphical depiction of numerous data points illustrating the screw-holding capacity of fiberboards of this invention as a function of the density of the material.

The newspaper was pulped in a Waring blender; the gypsum and polymer binder were added, and the blended mixture was pressed into ¾ inch thick slabs at a rate to avoid geysering. Building materials within the scope of this invention, prepared by the process described hereinabove, were tested for flexural strength, as defined by the following procedure. These tests generally employed ASTM Method C 473-86a modified in that the specimens were ½ inch thick, 1 inch wide, and 4 inches long, with random orientation. In each case, the specimen was supported on bearings 3 inches apart, and the specimen was broken across the 1 inch width. Evaluation of flexural strength as a function of the density of fiberboards was undertaken, and the results appear in FIG. 3. The flexural strength of fiberboards within the scope of this invention generally should be at least about 30 lbs, preferably at least about 60 lbs (½ inch thick sample).

Fiberboards within the scope of this invention were evaluated for screw-holding capacity, as defined by the following procedure. In these tests, a specimen of material to be tested, dried to constant weight and ½ inch +/−1/32 inch thick, at least 9 inches long, and nominally 1 9/16 inches wide, was employed. At midwidth, a 5/32 inch pilot hole was drilled to receive a No. 12 sheet metal screw. With the specimen supported on a wooden block or steel plate and the pilot hole centered over a 5/8 inch hole in the support, the screw was turned until the full shank thickness penetrated the specimen. Force was then applied vertically at the center of the screw, forcing the screw through the specimen, and the force was noted. Evaluation of the screw-holding capacity of fiberboards within the scope of this invention was undertaken, as set forth in Fiberboard Example 2. The results indicate that screw-holding capacity was generally about 400 lbs or greater for board densities of about 60 lbs/ft3 or greater, with screw-holding capacities of about 700–800 lbs being achieved with board densities as of about 70–75 lbs/ft3. In general, the screw-holding capacity of a building material within the scope of this invention should be at least about 400 lbs, and for a member used as a support or mullion in glass partition walls, the screw-holding capacity should preferably be at least about 500 lbs, more preferably in excess of about 600 lbs.

FIBERBOARD EXAMPLE 2

A casting composition was prepared containing the following ingredients in parts by weight:

TABLE III

| Base Casting Composition | |
| --- | --- |
| Ingredient | Quantity |
| gypsum hemihydrate | 113 |
| newspaper | 20 |
| water | 500 |

The newspaper was pulped in a Waring blender; the gypsum was added, and varying amounts of the blended mixture were added to a mold and pressed to ½ inch thick slabs. After curing and drying, the density and screw-holding capacity of each slab was measured.

The screw-holding capacity of the fiberboards of this invention is enhanced through the use of binder polymer as illustrated in Fiberboard Example 3.

FIBERBOARD EXAMPLE 3

In each case, the casting composition included 113 g calcined non-fibrous gypsum, 20 g paper, 2.2 g glass textile fiber, and 5 g binder polymer.

TABLE IV

Physical Properties of Various Fiberboards Per Binder Polymer Type

| Binder Polymer Capacity | Product Density lbs/ft³ | Screw-Holding lbs |
| --- | --- | --- |
| AIRFLEX | | |
| 4530[a] | 67.5 | 749 |
| 4500 | 65.8 | 670 |
| 7522 | 68.6 | 730 |
| 4514 | 68.8 | 689 |
| UCAR-130[b] | 66.6 | 890 |
| GEN FLO 6500[c] | 68.9 | 718 |
| UCAR-376[d] | 71.6 | 678 |
| UCAR-417[e] | 66.7 | 650 |

[a]The AIRFLEX products are all ethylene/vinyl chloride
[b]Polyvinyl acetate homopolymer
[c]Styrene/butadiene
[d]Vinyl/acrylic
[e]Acrylic

Glass Partition Walls

Applicants have surprisingly discovered that fire resistant structures comprising glass panels and gypsum-based framing members supporting the glass panels are capable of exhibiting extraordinary fire resistant properties. Accordingly, the broad scope of the present invention is directed to any structure which incorporate glass panels, including doors with window lights, window frames and the like.

A specifically preferred embodiment of the present invention, however, is directed to glass partition walls, and even more particularly interior glass partition walls. An exemplary partition wall in accordance with this aspect of the present invention is illustrated in a semi-schematic, elevation view in FIG. 5 hereof.

Figure 5:
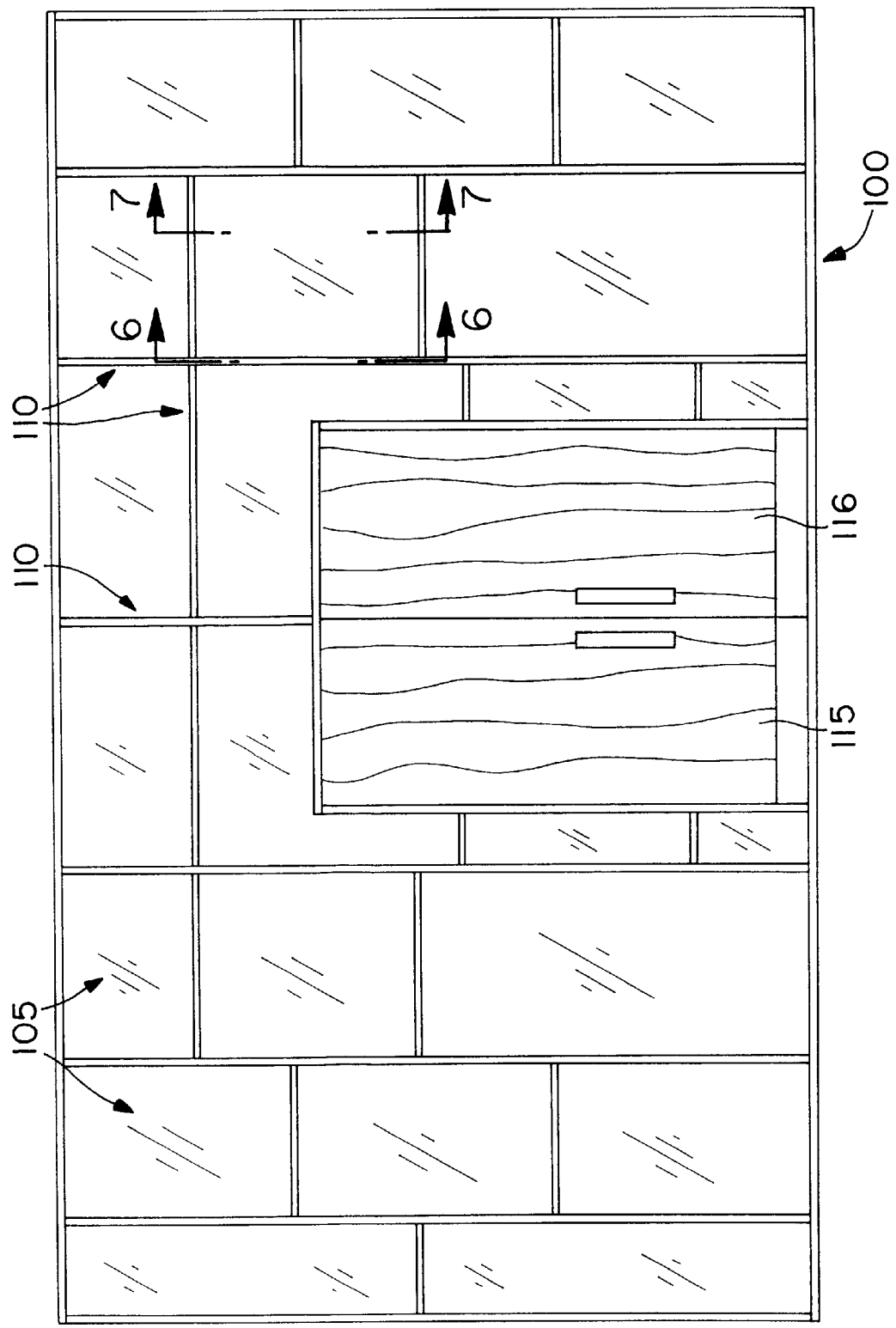
FIG. 5: is an elevation of a glass partition wall in accordance with one embodiment of this invention.

With particular reference now to FIG. 5, a glass partition wall is indicated generally as 100. The wall 100 is comprised of a plurality of glass panels 105 supported by framing members 110. The partition wall 100 also includes a doorway containing doors 115 and 116.

The glass panels 105 are supported by a plurality of framing members 110, at least a portion of which and preferably substantially all of which, are formed from the gypsum-based fiberboard compositions described above.

Furthermore, it is generally preferred that the gypsum-based fiberboard members have decorative materials applied to the exposed surfaces thereof to enhance the ascetics of the partition wall in which they are used. For example, it is contemplated that paints, lacquers and the like may be readily applied to the gypsum fiberboard members of the present invention to enhance the appearance thereof. Alternatively and preferably, a thin, wood-like veneer is fastened, and preferably adhesively fastened, to the exposed surfaces of the framing member. Applicants have found that such veneer materials are easily and strongly adhered to the gypsum-based framing members of the present invention and greatly enhance the ascetic quality of partition walls formed therefrom.

Applicants have also surprisingly found that the incorporation of such wood or wood-like veneers does not substantially detract from the fire-resistant properties of the present structures. More particularly, the use of gypsum-based fiberboard members in accordance with the present invention substantially reduces the tendency of such veneer materials to detrimentally flame during fire tests. Instead, applicants have observed that such materials tend to char in a fashion that is not detrimental to the structural integrity of the partition wall. Although applicants do not intend to necessarily be bound by or limited to any particular theory of operation, it is believed that the relatively high heat capacity of the water of hydration bound in the set gypsum of the present framing members tends to protect such veneers from rapid and detrimental flaming. Accordingly, highly fire-resistant structural members having many of the desirable features, qualities, and ascetics of wood can be formed from gypsum-based fiberboard compositions in accordance with the present invention.

Applicants have found that this highly unexpected and surprising property of the present structures is of critical importance to the success of certain embodiments of the present invention. For example, an appealing appearance and other aesthetic qualities are essential features of many commercially successful interior partition structures. Since gypsum-based fiberboard products generally do not themselves possess attractive or aesthetic qualities, they would not be considered acceptable alternatives in the first instance. On the other hand, while wood and other materials exhibit acceptable aesthetic characteristics, they are wholly unacceptable from the perspective of fire-resistant properties. Thus, the combination of a gypsum-based fiberboard member faced with an aesthetic veneer is a critical requirement according to certain embodiments of the present invention. As mentioned above, this essential feature produces highly unexpected results since the veneer materials would not under normal circumstances exhibit satisfactory fire-resistant qualities when exposed directly to the heat and flame conditions of a fire test. However, because of the aforementioned synergistic interaction between the gypsum-based member and the veneer material, particularly wood and wood-like veneer materials, the present invention achieves at once both fire-resistant properties and highly aesthetic appearance.

Figure 6:
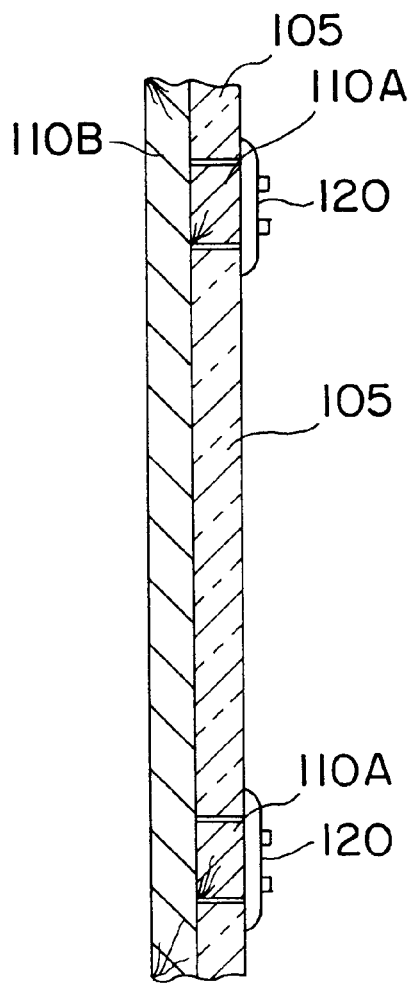
FIG. 6: is cross-sectional view taken along line 6—6 of FIG. 5.
Figure 7:
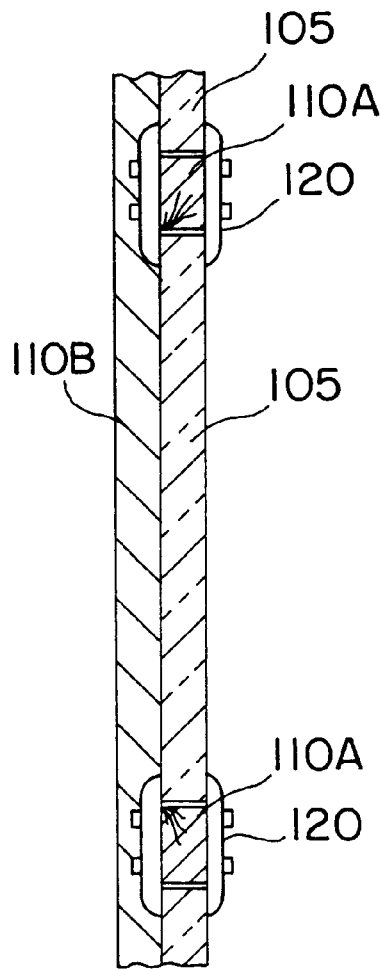
FIG. 7: is a cross-sectional view taken along line 7—7 of FIG. 5.

Although it is contemplated that any conventional and well-known means for constructing glass partition walls from wood may be utilized to form such structures from the gypsum-based fiberboard members of the present invention, one type of illustrative construction is shown in cross-section in FIGS. 6 and 7. More particularly, a horizontal gypsum-based fiberboard framing member 110A is attached to a gypsum-based vertical framing member 110B. Framing members 110A and 110B can be attached by any conventional means employed for wood framing members, including adhesive bonding, nailing, screwing and the like. These gypsum-based fiberboard framing members together support glass panels 105, which are preferably held in place by lengths of decorative molding 120. The decorative molding 120 can be formed from any one of several well-known and conventional materials used for such functions, including wood and the like. Because the gypsum-based fiberboard framing members 110 possess exceptional screw and nail holding capacity, a preferred means for mounting molding strips 120 to such members include nailing and screwing. Of course, molding strips 120 may, if desired, also be formed of a gypsum-based fiberboard composition of the present invention, which in turn can then be screwed, nailed, or otherwise fastened to gypsum-based fiberboard framing members 110A.

Figure 8:
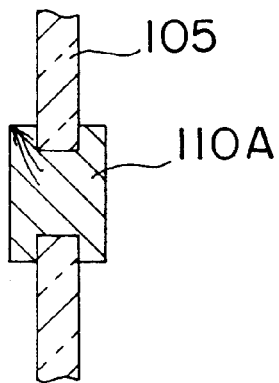
FIG. 8: is a cross-sectional view of an alternative construction for a horizontal framing member and bead in accordance with the present invention.

It will be appreciated by those skilled in the art in view of the present disclosure that numerous and varied alternative constructions are available for use within the scope of the present invention. For example, FIG. 8 illustrates an alternative to the construction technique illustrated in FIG. 7. More particularly, a horizontal gypsum-based fiberboard member 110A having an I-beam type configuration is utilized. It is contemplated that such a member can be produced in any one of several ways. For example, because of its excellent machinability, it is possible to machine channels in a stud-like member using conventional techniques. Alternatively, it is contemplated that such gypsum-based fiberboard members may be produced with the appropriate configuration by use of an appropriate mold.

Another alternative and preferred embodiment of the present invention is illustrated in FIGS. 9 and 10 hereof. More particularly, FIGS. 9 and 10 illustrate the construction of a glass panel wall which eliminates the need for intumescent gaskets and like material between the gypsum-based framing members and the glass panels of the present invention. More particularly, FIG. 9 illustrates a pair of glass panels 105 supported by horizontal, gypsum-based framing members 110A. Bead members 120, also formed of the gypsum-based composition of the present invention, are utilized to further support glass panels 105. Applicants have surprisingly and unexpectedly found that the use of gypsum-based compositions as framing members in accordance with the present invention permits the use of nonintumescent gasket material 130 to fill the voids between the gypsum-based members 110A/120 and glass panels 105. Although such a highly cost-effective construction technique is not feasible for use with either wood or steel framing members, it is contemplated that glass-containing structures in accordance with this embodiment of the present invention are capable of achieving a 20-minute ASTME-152 fire test rating, and even more preferably a 90-minute ASTME-152 fire test rating.

EXAMPLE 4

Figure 11:
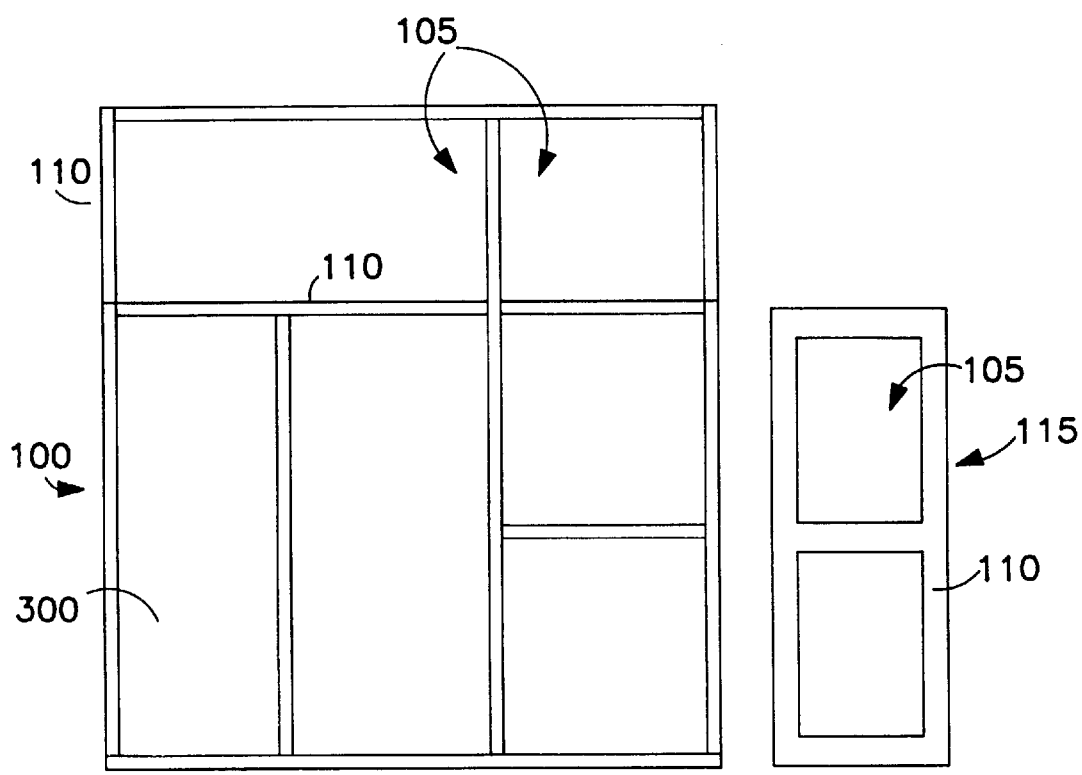
FIG. 11: is a schematic/elevational view of a glass partition wall in accordance with an embodiment of this invention as described in Example 4.

An interior partition wall comprising at least 50% glass pursuant to British Standard BS476: part 22: 1987 was constructed from gypsum-based framing members having composition substantially as disclosed in Example 3 hereof. As illustrated in FIG. 11, the partition wall 100 had an overall horizontal dimension of 3,000 millimeters and an overall vertical dimension of about 3,000 millimeters. The partition wall consisted of a two-light glass door 115 (which is shown separated from the opening 300 in which it was installed during the test described hereinafter) door having a width of about 1,000 millimeters and a height of about 2,000 millimeters, with each light 105 having the width of about 560 millimeters, and a height of about 823 millimeters. The door was constructed from gypsum fiberboard members 110 in which mortis and tendon joints were used at the transom/mullion intersections. Fastening of the gypsum-based fiberboard framing members was otherwise accomplished in conventional fashion with screws and/or nails. Horizontally adjacent to the door was a glass pane having a height of about 2,000 millimeters and a width of about 1,000 millimeters. Above the top of the glass door and the aforementioned glass pane was a glass pane, having a width of about 2,000 millimeters and a height of about 2,000 millimeters. Adjacent to the glass panes described above were a series of 3 vertically stacked glass panes having a height and a width of about 1,000 millimeters.

Figure 12:
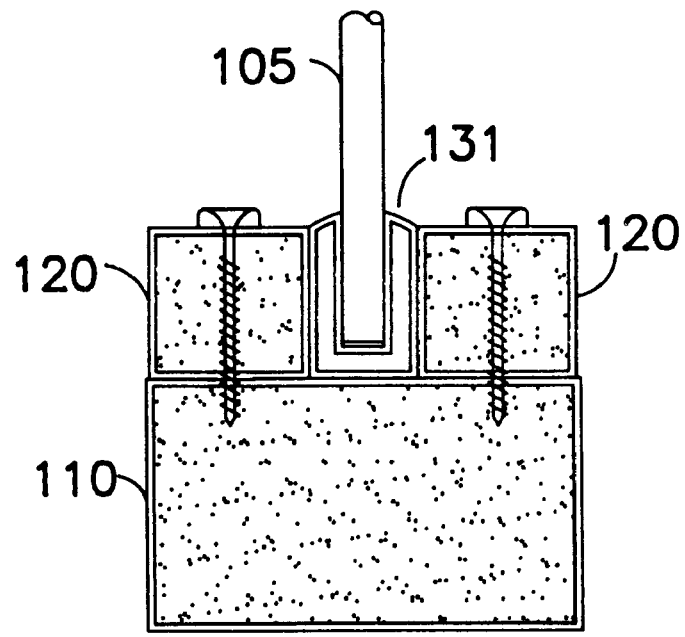
FIG. 12: is a schematic/cross sectional view showing the beading configuration used in accordance with the embodiment of the invention illustrated in FIG. 11 and described in Example 4.
Figure 13:
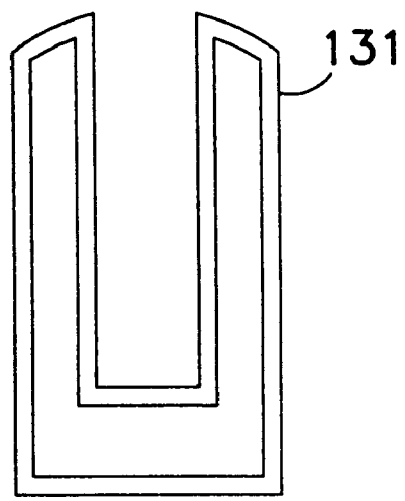
FIG. 13: is a schematic view of the intumescent gasket material used according to the embodiment illustrated in FIGS. 11 and 12 and described in Example 4.

The glass panes and the window lights for the doors were glass panels sold under the trade designation "Pyran S" by Schott Glass LTD, Drummond Road, Stratford, England. The glass panels were approximately 6.5 millimeters (±0.5 mm) thick. The gypsum-based framing members had a thickness of about 40 millimeters and were faced with wood veneer. The beads and the framing members were attached to one another via screws and nails. As illustrated in FIG. 12 Mortis-tendon joints were used at the transom/mullion intersections. Intumescent material having the configuration shown in FIG. 13 was used between the gypsum-based framing members and the glass panels, as shown in FIG. 12.

The interior partition wall constructed as indicated above was tested pursuant to British fire standard BS 476: part 22: 1987. The test results indicate that the partition so constructed achieved a 90 minute fire test rating pursuant to this standard.

EXAMPLE 5

A hose stream test is performed on a partition structure comprising at least about 50% glass in accordance with BS476: part 22: 1987. Immediately after testing in accordance with an endurance test such as ASTME-152, the partition wall is exposed to a hose stream test. The hose stream test includes exposing the partition wall to a stream of water at a pressure of about 30 lbs/sq.in. (psi). The pressurized stream is traversed over the exposed face of the partition wall for a period of about 24 seconds (1.5 sec/sq.ft) in accordance with requirements for test standards for 90 minute rated openings. No through openings in the partition wall or any part thereof are observed either during or after the test.

We claim:

1. An improved interior glass partition wall of the type having glass panels supported by framing members and at least a 20 minute ASTME-152 fire test rating, said partition wall characterized by at least one framing member comprising a gypsum-containing fiberboard composition having a density of at least about 60 lbs/ft$^3$, a flexural strength of at least about 30 lbs (½ inch thick material), and a screw-holding capacity of at least about 400 lbs, said composition containing a substantially uniform distribution of solids including about 40 wt. % to about 97 wt. % set gypsum dihydrate and about 1.5 wt. % to about 30 wt. % paper fiber.

2. The partition wall of claim 1 wherein said framing member composition further comprises about 1.5 wt. % to about 35 wt. % of performance booster selected from inorganic fiber, clay, vermiculite, binder polymer, and combinations of these.

3. The partition wall of claim 1 wherein said framing member composition has a density of at least about 75 lbs/ft$^3$ and a screw-holding capacity of at least about 500 lbs.

4. The partition wall of claim 1 wherein said framing member composition comprises about 75 wt. % to about 95 wt. % set gypsum dihydrate, about 5 wt. % to about 15 wt. % paper fiber, and about 1.5 wt. % to about 35 wt. % of performance boosters selected from inorganic fiber, clay, vermiculite, binder polymer and mixtures of these.

5. The partition wall of claim 1 having at least a 90 minute ASTM E-152 fire test rating.

6. The partition wall of claim 1 wherein said paper fiber comprises recycled scrap paper.

7. The partition wall of claim 1 wherein said composition comprises about 1 wt. % to about 3 wt. % binder polymer.

8. The partition wall of claim 7 wherein said binder polymer comprises at least one of: poly(vinyl acetate), poly acrylate, and poly(vinyl alcohol).

9. The partition wall of claim 1 wherein said composition comprises from about 88 wt. % to about 92 wt. % set gypsum dihydrate, about 5 wt. % to about 10 wt. % paper fiber, from about 1 wt. % to about 3 wt. % inorganic fiber, and from about 0.5 to about 2 wt. % vermiculite.

10. The partition wall of claim 9 wherein said composition has a density of at least about 80 lbs/ft$^3$ and a screw-holding capacity of at least about 500 lbs.

11. The partition wall of claim 10 wherein said inorganic fiber comprises glass textile fiber.

12. The partition wall of claim 1 wherein said member has a decorative wood veneer adhered to at least one surface thereof.

13. The partition wall of claim 1 further comprising gasket material between said glass panel and said gypsum-containing framing member.

14. The partition wall of claim 13 wherein said gasket material is a nonintumescent material.

15. An improved structure of the type having glass panels supported by framing members, said structure characterized by at least one framing member comprising a gypsum-containing fiberboard composition having a density of at least about 60 lbs/ft$^3$, said composition containing a substantially uniform distribution of solids including set gypsum dihydrate and about 1.5 wt. % to about 30 wt. % paper fiber.

16. The structure of claim 15 wherein said framing member composition further comprises about 1.5 wt. % to about 35 wt. % of performance booster selected from inorganic fiber, clay, vermiculite, binder polymer, and combinations of these.

17. The structure of claim 15 wherein said framing member has a screw-holding capacity of at least about 400 lbs.

18. The structure of claim 15 wherein said framing member composition comprises about 75 wt. % to about 95 wt. % set gypsum dihydrate, about 5 wt. % to about 15 wt. % paper fiber, and about 1.5 wt. % to about 35 wt. % of performance boosters selected from inorganic fiber, clay, vermiculite, binder polymer and mixtures of these.

19. The structure of claim 15 having at least a 20 minute ASTM E-152 fire test rating.

20. The structure of claim 15 wherein said paper fiber comprises recycled scrap paper.

21. The structure of claim 15 wherein said composition comprises about 1 wt. % to about 3 wt. % binder polymer.

22. The structure of claim 21 wherein said binder polymer comprises at least one of: poly(vinyl acetate), poly acrylate, and poly(vinyl alcohol).

23. The structure of claim 15 wherein said composition comprises from about 88 wt. % to about 92 wt. % set gypsum dihydrate, about 5 wt. % to about 10 wt. % paper fiber, from about 1 wt. % to about 3 wt. % inorganic fiber, and from about 0.5 to about 2 wt. % vermiculite.

24. The structure of claim 15 wherein said composition has a density of at least about 80 lbs/ft$^3$ and a screw-holding capacity of at least about 500 lbs.

25. The structure of claim 24 wherein said inorganic fiber comprises glass textile fiber.

26. The structure of claim 25 wherein said member has a decorative wood veneer adhered to at least one surface thereof.

27. The structure of claim 15 further comprising gasket material between said glass panel and said gypsum-containing framing member.

28. The structure of claim 27 wherein said gasket material is a nonintumescent material.

29. A method of preparing a glass partition wall of the type having a glass panel supported by at least first and second framing members and having at least a 20 minute ASTM E-152 fire test rating, characterized by the steps comprising:

attaching said first framing member to said second framing member to provide support for said glass panel, at least one of said framing members comprising a gypsum-containing fiberboard composition having a density of at least about 60 lbs/ft$^3$, a flexural strength of at least about 30 lbs (½ inch thick material), and a screw-holding capacity of at least about 400 lbs, said composition containing a substantially uniform distribution of solids including about 65 wt. % to about 97 wt. % set gypsum dihydrate and about 1.5 wt. % to about 30 wt. % paper fiber, about 75 wt. % to about 90 wt. % set gypsum dihydrate, about 10 wt. % to about 17 wt. % paper fiber, and a density of at least about 60 lbs/ft$^3$, and a honeycomb-like structure.

30. The method of claim 29 wherein one of said members is a decorative molding.

31. The method of claim 29 wherein said attaching step comprises nailing or screwing.

32. The method of claim 29 wherein gypsum-containing framing member is a machined framing member.

* * * * *